United States Patent [19]
Anderson

[11] Patent Number: 5,678,053
[45] Date of Patent: Oct. 14, 1997

[54] GRAMMAR CHECKER INTERFACE

[75] Inventor: David B. Anderson, Belmont, Mass.

[73] Assignee: Mitsubishi Electric Information Technology Center America, Inc., Cambridge, Mass.

[21] Appl. No.: 315,239

[22] Filed: Sep. 29, 1994

[51] Int. Cl.⁶ .................................................. G06F 17/28
[52] U.S. Cl. .................. 395/759; 395/793; 395/795; 395/803
[58] Field of Search ............ 364/419.02, 419.03, 364/419.04, 419.05, 419.06, 419.07, 419.08, 419.1, 419.11, 419.12, 419.13, 419.14, 419.17; 395/759, 788, 791, 792, 793, 794, 795, 803

[56] References Cited
U.S. PATENT DOCUMENTS 4,859,091  8/1989  Ueda ........................................ 400/63
4,887,212  12/1989  Zamora et al. ..................... 364/419.08
5,070,478  12/1991  Abbott ............................... 364/419.03

OTHER PUBLICATIONS

Patent Abstracts of Japan, Publication No. 06318267A, date of publication of application—Nov. 15, 1994, Application No. 06064944 filed Apr. 4, 1994.

*Primary Examiner*—Jeffery Hofsass
*Assistant Examiner*—Andrew Hill
*Attorney, Agent, or Firm*—Robert K. Tendler

[57] ABSTRACT

A convenient interface for a grammar checking system in which improper utilization of words in a sentence is detected and in which corrected words are suggested for insertion in the sentence including means for underlining incorrectly used words and means for providing a caret or inverted V type indicia for words which are to be inserted, with the caret indicating a missing word in the sentence.

8 Claims, 7 Drawing Sheets

GRAMMAR CHECKER INTERFACE

FIELD OF INVENTION

This invention relates to grammar checking systems and more particularly to a convenient interface for immediately indicating how to correct an improper sentence.

BACKGROUND OF THE INVENTION

Grammar checking systems such as that associated with Microsoft Word and Word Perfect in essence analyze a sentence for improper utilization of words based upon either spelling, context, or both. As is now possible, and as is described in U.S. patent application Ser. No. 08/252,572, by Yves Schabes, Emmanuel Roche, and Andrew R. Golding, assigned to the assignee hereof, a sentence is first parsed as to its parts of speech, with a part of speech tag being provided to each of the words in a sentence. The sentence is then analyzed for proper grammatical usage of the words in the sentence, and various infirmities of the sentence are detected. Amongst these infirmities are missing determiners such as "the" or "a", improper use of the word "a" or "an," improper auxiliary verb sequences such as "I have have a good time," improper inflection of a verb as it relates to its tense, improper capitalization and other grammatical errors.

While grammar checking systems provide adequate interfaces so that the user can understand what is wrong with the sentence and understand how to correct it, the usual presentation is one of highlighting of the words followed by a presentation of a grammar checking box in which the sentence is portrayed followed by a highlight of the suggestions made. This form of indication is easily implementable through Windows, but is one which does not provide an optimal interface.

Specifically, such a presentation of the grammar checking output does not conform to the usual editorial notation for editing a sentence in which standard symbols are utilized to indicate what is to be done to the sentence. Moreover, prior art grammar checker interfaces fail to display where a missing word exists or where the missing word is to be inserted. As a result, the fact of a missing determiner such as "the" and "a" or a missing word for an incomplete sentence has no representation in present interface systems utilized with the grammar checkers. Additionally, the highlighting system is not user friendly in that it does not comport to the usual method of editing a sentence.

SUMMARY OF THE INVENTION

Rather than utilizing the highlighting system which is associated with all of the present grammar checking systems, in the Subject System wrong words are underlined and missing words are indicated by a caret or inverted V. The advantage of such a system is that wrong words are quickly spotted and the fact of a missing word is quickly indicated to the user. Especially with non-native language users, most of the mistakes that are made have to do with missing articles or determiners; and the Subject System permits rapid alerting to this common mistake. Moreover, since the underlining system of the present invention does not utilize the highlighting symbol, its underlining indication of a wrong word is easily distinguished from either usual computer control icons or the highlighting normally associated with both spell checking, grammar checking, and other computer control functions.

In one embodiment the computer presents each problematic sentence on screen, marking each error by underlining words that need to be changed and marking points where a word or words need to be inserted with a caret in much the same way that a human proofreader would mark up a galley.

In one embodiment after the incorrectly used words or missing words are identified, a subroutine finds the place on the screen where the word exists in the sentence. Depending on the type of incorrect usage, the caret is placed at or between the words that have been found to contain the incorrect grammar usage. In order to ascertain the position at which the indicia should be located, the characters in front and behind the caret are identified as to location. This is the last letter of the word proceeding the caret and the first letter of the word after the caret.

The way that position is initially determined is to assign to each character in the sentence a number corresponding to its position along the length of the sentence. After having ascertained the numeric position of the characters involved, a subroutine determines where on the screen characters at the various positions are located. After the positions of the characters on the screen have been identified in the aforegoing manner, a subroutine draws the marks at or adjacent the indicated characters at the appropriate position on the screen. In the case of the caret, the mark is drawn underneath the line of the characters between the character representing the last character of the preceding word and the first character of the succeeding word. Also, in the case of the caret, where the word would normally be the last word in the line of the text, a subroutine determines that the caret should be put at the beginning of the next line of text, although this is a matter of design choice.

With respect to underlining, the word or words in question are identified as described above, with the words having a beginning character and an end character whose positions are ascertained in terms of numerical position. Having ascertained that an entire word or series of words is incorrect, a line is drawn under the first character of the offending word or series of words and extends to the last character of the offending word or words, with the line going from the position indicated by the number of the first character of the first word to the last character of the last word. In the case where the words involved span two lines of text, the last character of the last word on the line is identified as the position to which the line is to be drawn, and that position is the end point for the line of that line of text. The next word being on a different subsequent line of text has its first character identified followed by identifying the last character of the involved word so as to identify its position. Having recognized that the words in question extend from one line to the next, the position assignments are made in accordance with the above scheme and the appropriate underlining takes place.

It will be appreciated that by positioning the caret below the line of text, there is no occurrence in which the caret would be located through a character or piece of text on that line. While the caret is presently envisaged as providing an indication of the requirement for the insertion of a word between words in which there would be a space between the words, the caret can also be utilized to indicate misspellings in which a given character in the word is indicated as being in error or wrong. Thus the subject system can indicate not only missing words within a sentence but also can be utilized to indicate which letters in a word are wrong from a spelling point of view.

BRIEF DESCRIPTION OF THE DRAWINGS

These and other features of the Subject Invention will be better understood in connection with the Detailed Description taken in conjunction with the Drawings of which.

DETAILED DESCRIPTION

Figure 1:
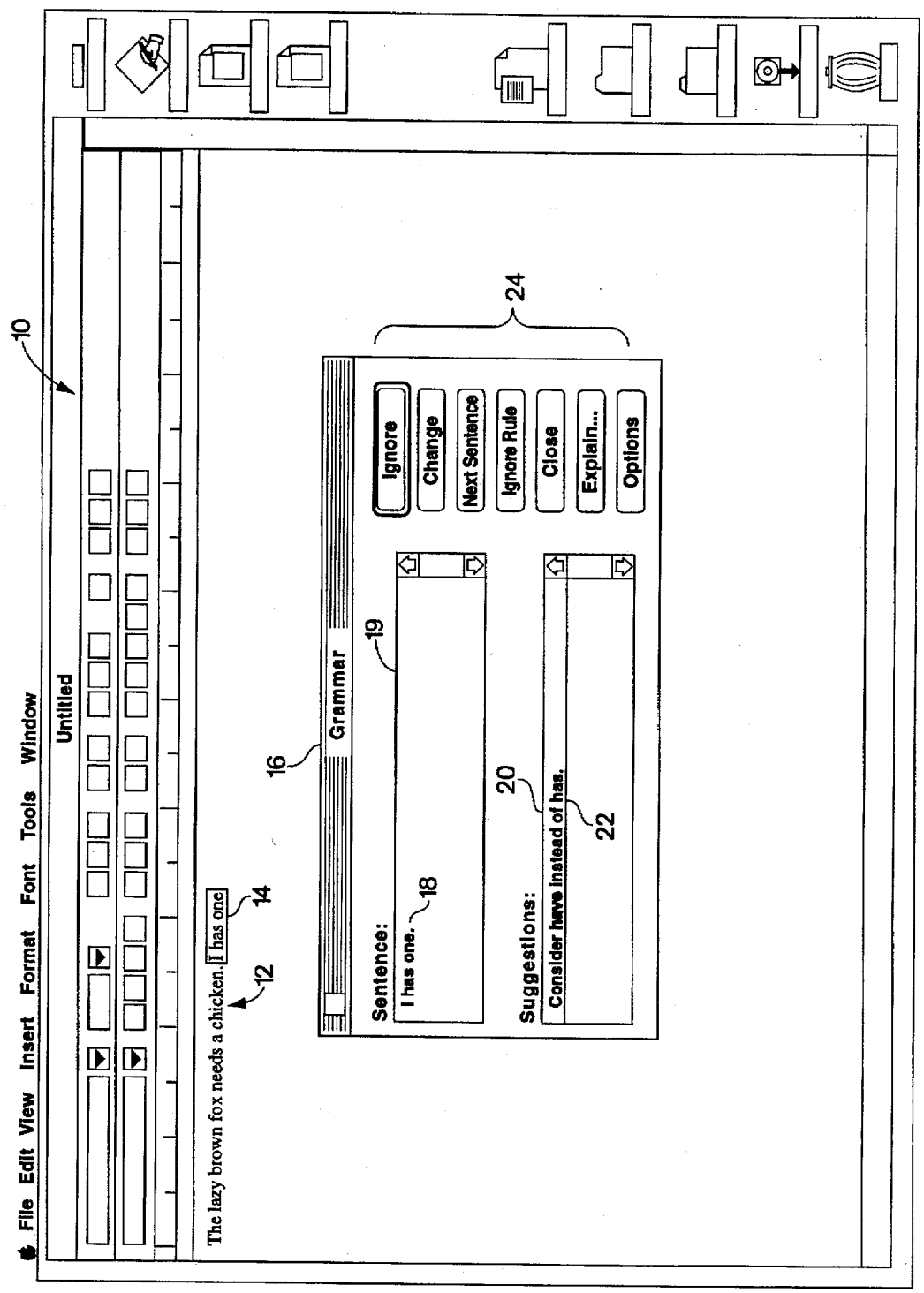
FIG. 1 is a diagrammatic representation of a computer screen in which the highlighting system of the prior art is shown to indicate the words in question and the suggestions indicated.

Referring now to FIG. 1, a typical prior art computer screen 10 is illustrated as indicating various windows formats by which two sentences 12 are checked as to grammar. As illustrated, the entire second sentence 14 is highlighted to indicate a problem with the grammar of the sentence. A separate screen 16 is presented to the user in a typical Windows format in which the sentence under consideration is illustrated at 18 in a box 19 within screen 16, along with a suggestions box 20 in which the suggestion is highlighted as illustrated at 22. It will be appreciated that typical user-selectable buttons 24 are used for controlling the grammar checking process as illustrated to the right within screen 16.

The problem with such an interface is that it portrays the grammar checking scenario with the usual computer control icons and indicia, particularly characterized by highlighting. It will also be appreciated that by highlighting one can never indicate that there is a missing word within a sentence.

Figure 2:
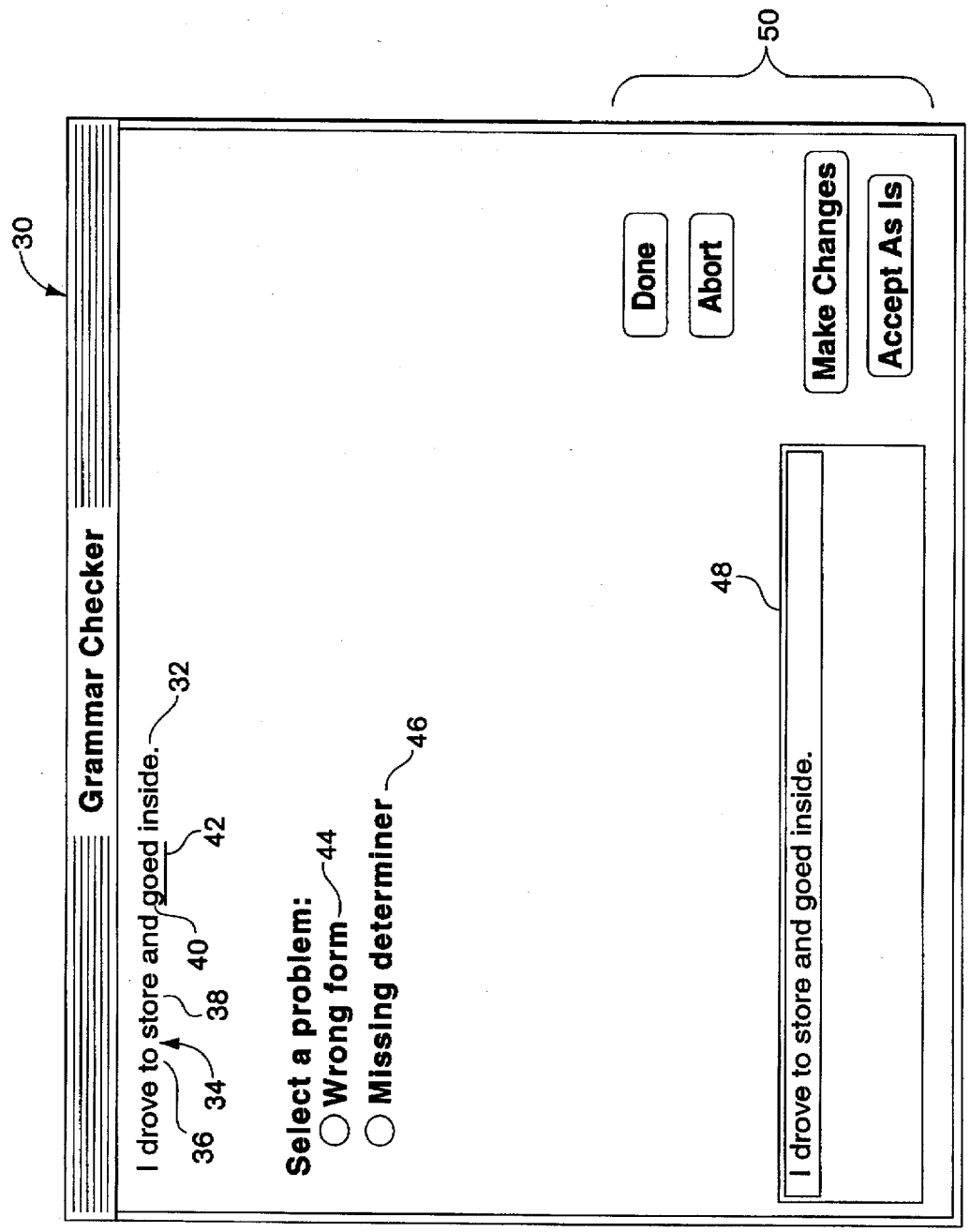
FIG. 2 is a diagrammatic representation of a computer screen indicating a sentence in which there is a missing determiner and the wrong form of a verb, with the missing determiner indicated by a caret and the wrong form of the verb indicated by underlining.

Referring now to FIG. 2, in the Subject System, as illustrated by computer screen 30, a sentence 32 that is being checked is indicated as having several problems. The first problem is a missing determiner illustrated by caret 34 which as can be seen is between a prior word 36 and a subsequent word 38. Note that the missing word is to be inserted between these two words. Also indicated is a word that is wrongly used in a sentence, namely the word "goed", illustrated at 40, which is the wrong form of the verb "go". Here the indicia is an underline 42 underneath the offending word. Note that the underlining underneath the sentence indicates the type of problem involved. For instance, in this sentence, there is a wrong form of the verb and this is indicated at 44, whereas the other problem with the sentence is a missing determiner, with this being indicated at 46. Also, as indicated at the bottom of the screen is the sentence under consideration which is highlighted as an optional feature as illustrated at 48. Control buttons 50 are illustrated to the right of the screen, with these buttons being equivalent to those associated with FIG. 1.

Figure 3:
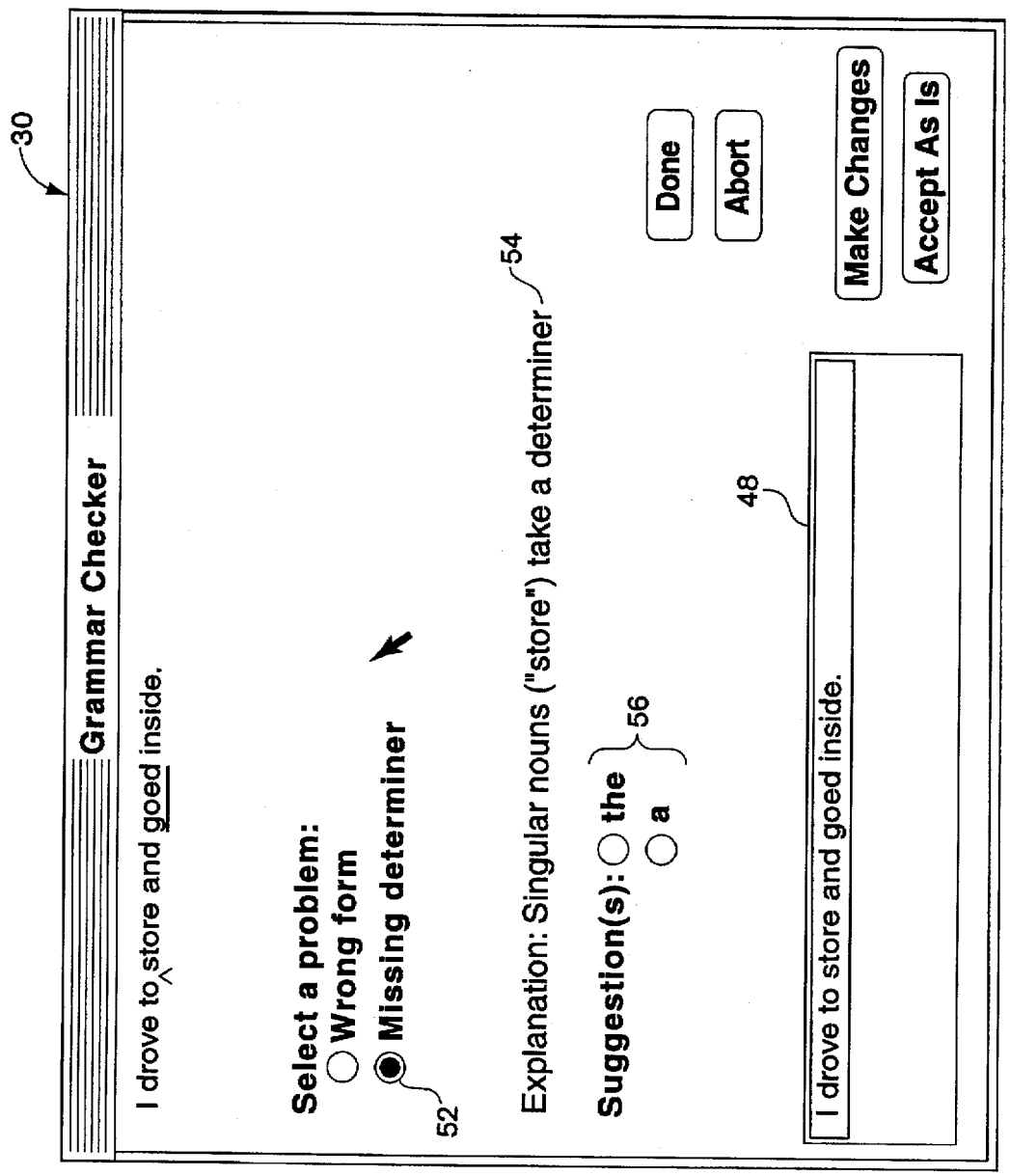
FIG. 3 is a diagrammatic illustration of a computer screen illustrating the selection of the request for the missing determiner problem by a user and an indication of suggested corrections.

Referring now to FIG. 3, a user with a mouse can decide to select the missing determiner problem as illustrated by the filled-in circle 52, with an indication of the problem associated with the missing determiner depicted therebeneath at 54. The suggestions for what should be inserted are illustrated at 56.

Figure 4:
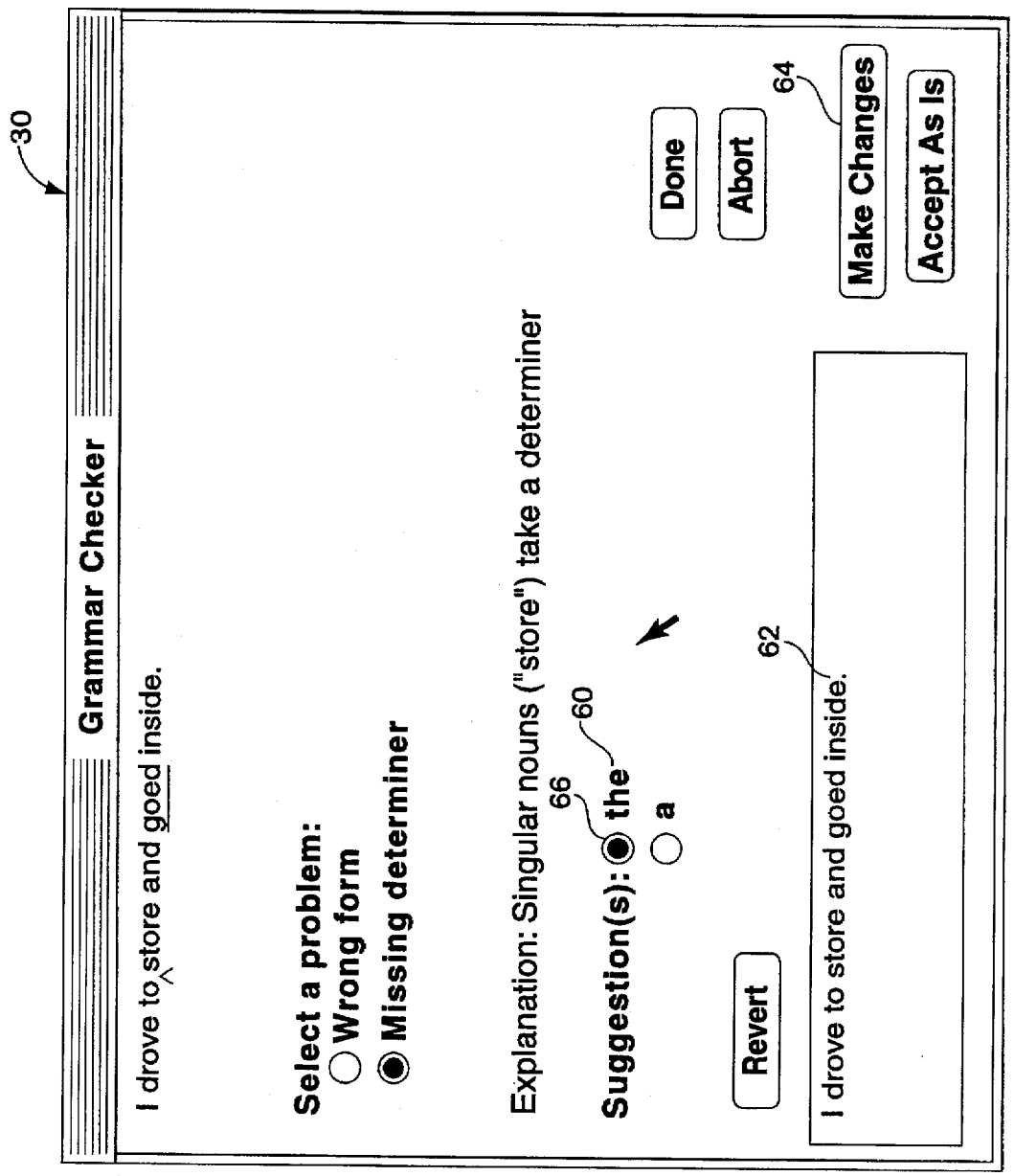
FIG. 4 is a diagrammatic illustration of the computer screen of FIG. 3 illustrating the selection of an appropriate determiner and the presentation of the correction therebeneath.

Referring now to FIG. 4, the user may select one of the two missing determiners as illustrated at 60, with the selection implemented and illustrated by the appropriate corrections in the sentences as illustrated at 62. This is accomplished by clicking on the "make changes" button 64 after having clicked on the selected determiner as illustrated at 66.

Figure 5:
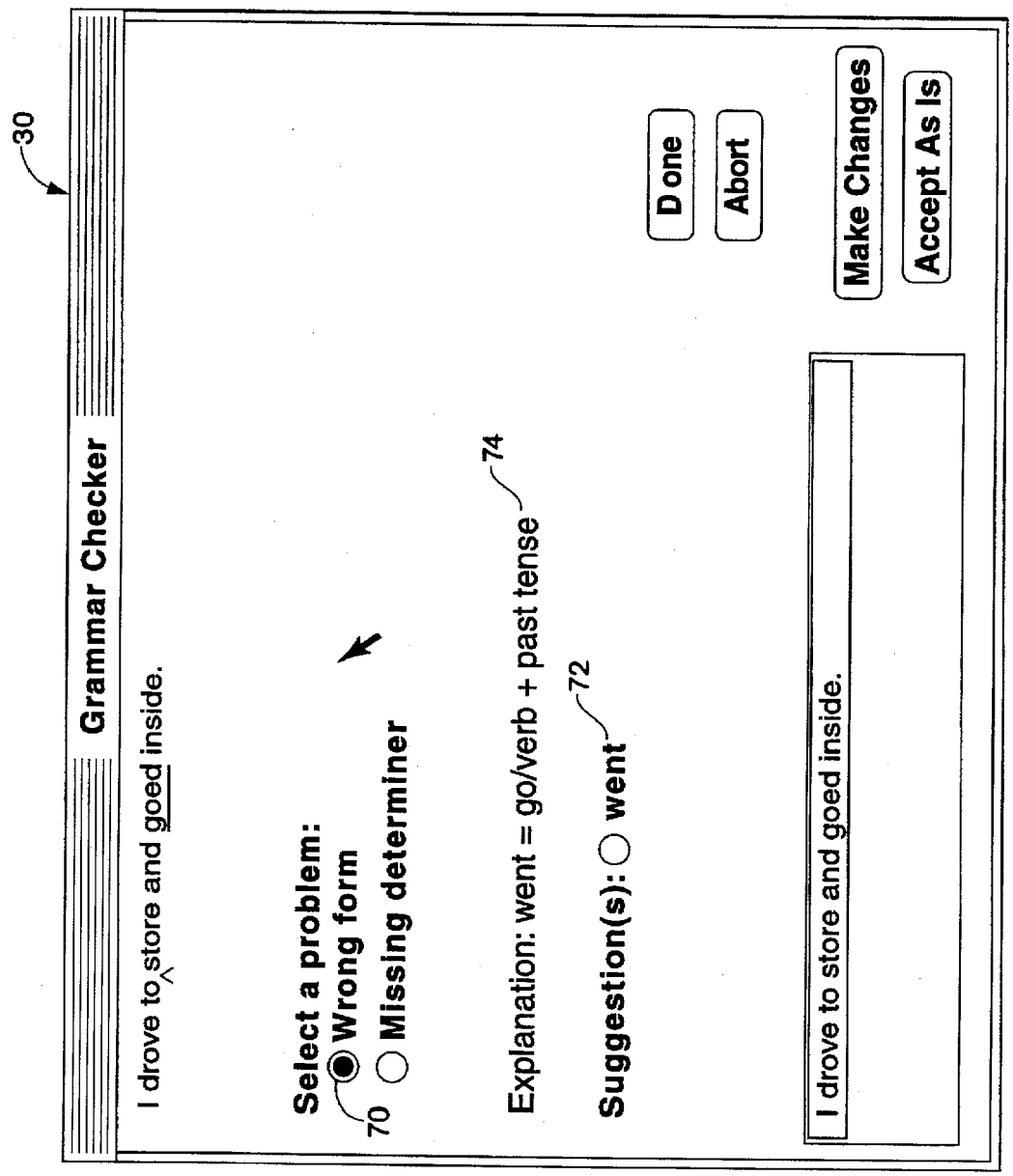
FIG. 5 is a diagrammatic illustration of a computer screen illustrating the selection of a request for the incorrect verb problem and an indication of a suggestion for the proper form of the verb.

Referring now to FIG. 5, the user may click on the second problem with the sentence, namely the "Wrong Form" as illustrated by the filled-in circle 70, with a suggestion being made by the system as illustrated at 72. Note that an explanation of why the suggestion is made is provided at 74, e.g. "went=go/verb+past tense."

Figure 6:
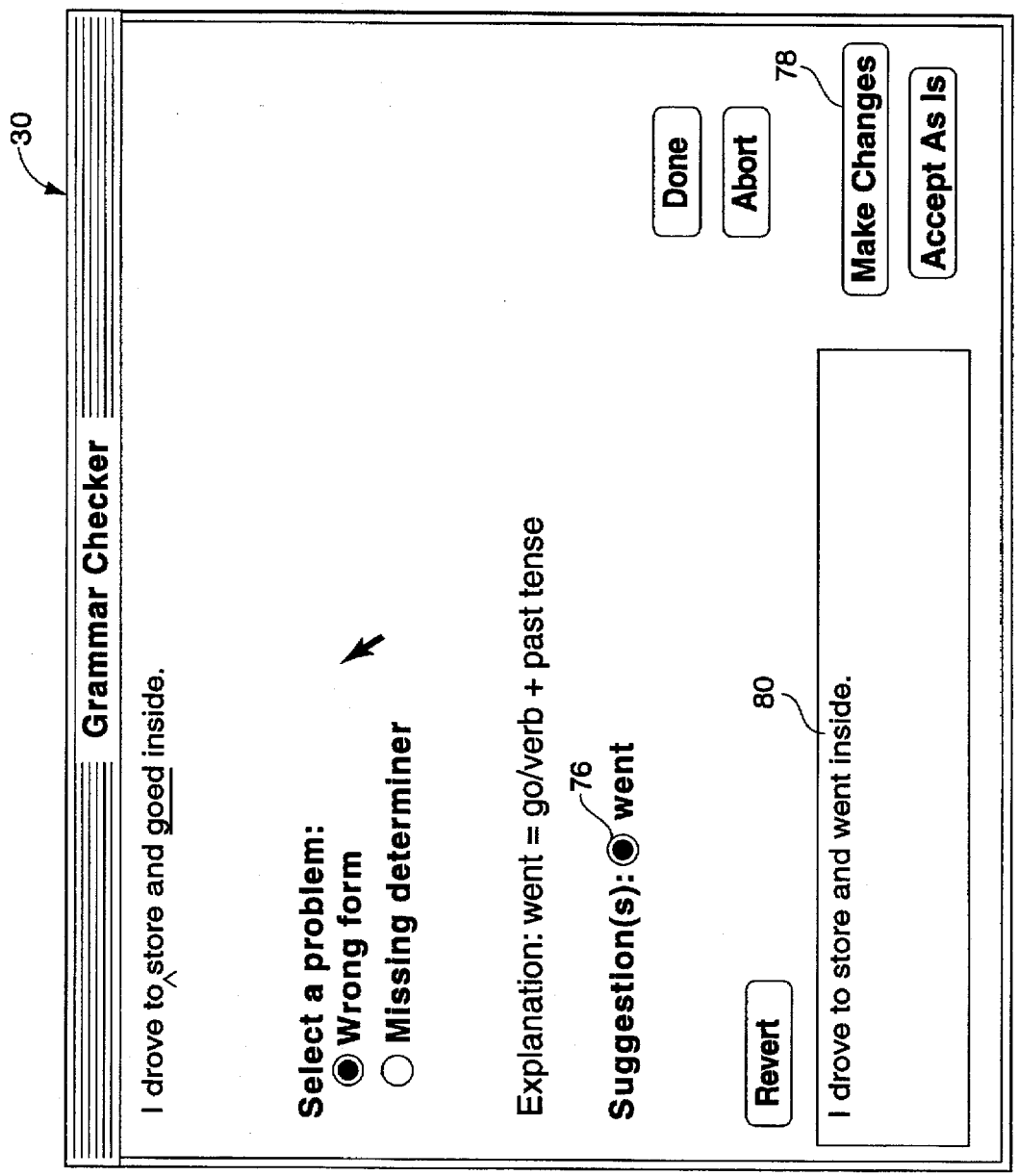
FIG. 6 is a diagrammatic illustration of the computer screen of FIG. 5 illustrating the presentation of the correct form of the verb, and its insertion into the sentence displayed; and, FIGS. 7A and 7B are respectively a block diagram of the Subject System and a flow chart illustrative of one embodiment of the interface for providing the indicia of FIG. 3–6.

Referring to FIG. 6, circle 76 is filled in to indicate that "went" is preferred and button 78 is selected, with the corrected sentence being presented as illustrated at 80.

What has been accomplished by the subject interface system is to provide a unique way of indicating what is wrong with a sentence in a way which does not intimidate computer illiterate users of the system. It is the wrong words and missing parts that are indicated in a format derived from traditional editing, making the system easy for those who are not necessarily computer literate. The indicia is also in a form which is unlike the highlighting form normally used in computer control and therefore provides a distinctive indicia or icon which separates the editing process from the computer control process, at least as far as the user is concerned.

Figure 7A:
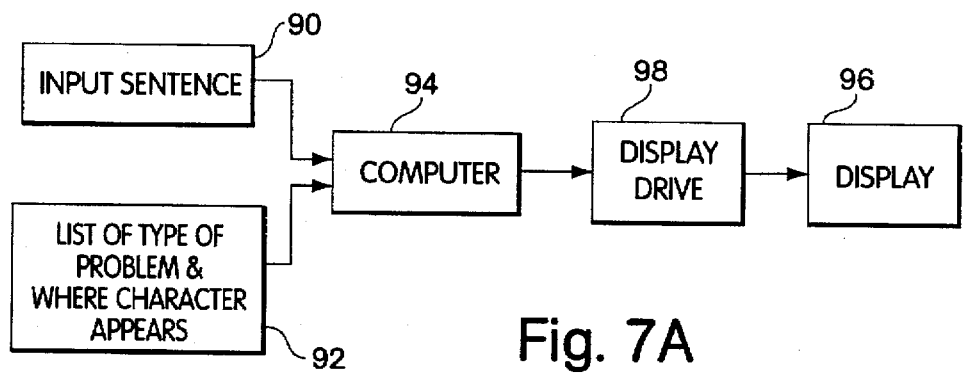
Figure 7B:
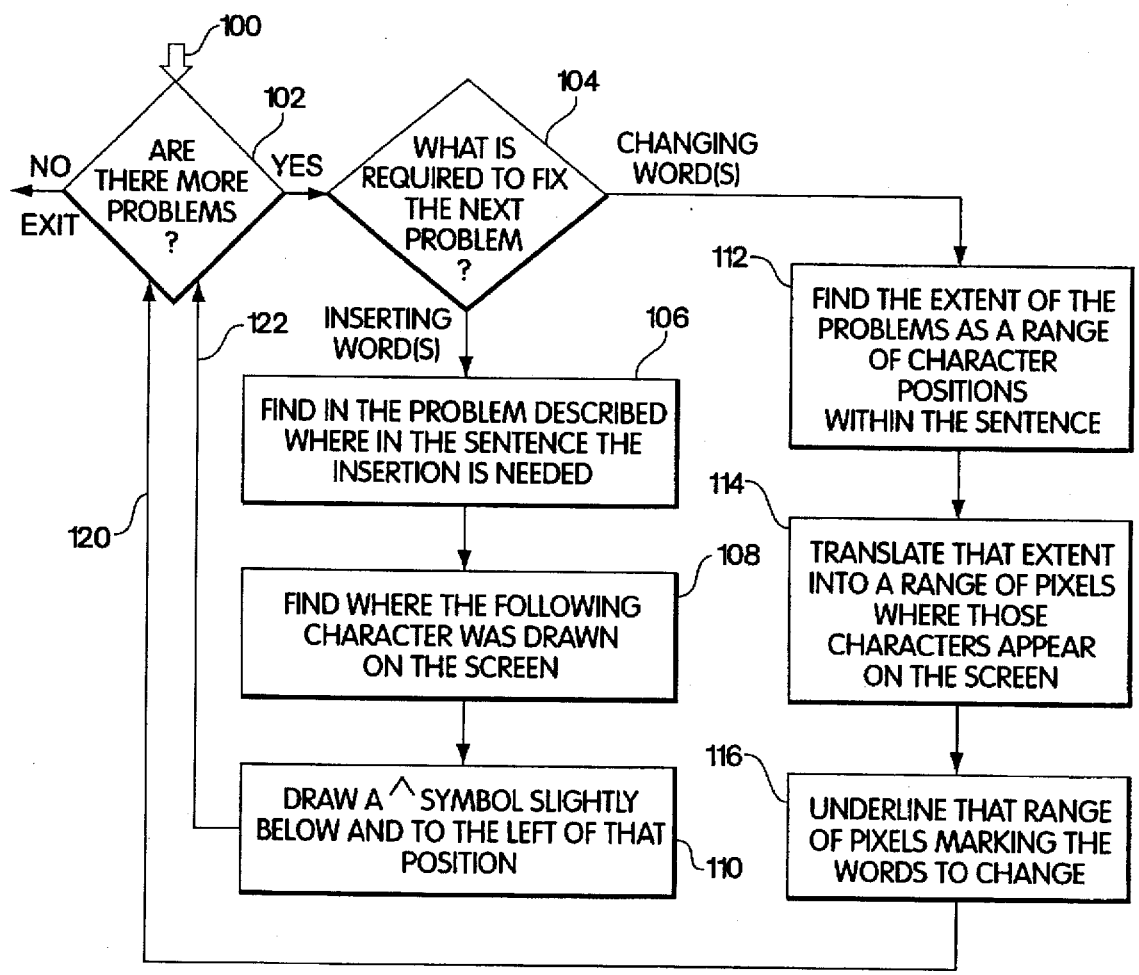

Referring now to FIGS. 7A and 7B, a block diagram and flow chart of the subject system is presented respectively.

Referring now to FIG. 7A, it will be appreciated that in order to generate the appropriate indicia on the screen, it is first necessary to provide both an input sentence 90 and a list of the type of problems of the sentence along with character positions as illustrated at 92. The outputs of these two devices are coupled to a computer 94 which drives a display 96 through the utilization of a display driver 98.

It is the purpose of this portion of the system to have as an input the sentence involved, along with a list of the problems. As a precondition the sentence in question is displayed on the screen through the utilization of computer 94 through display driver 98. The result of the operation of the subject interface is that the sentence is marked up to reflect the problems that have been encountered.

Referring now to FIG. 7B, the algorithm which is implemented via computer 94 is illustrated. Here input 100 is the sentence in question which is provided to a decision block 102. If there are problems with the sentence, decision block 104 is activated to ascertain that which is required to fix the particular problem. If the particular problem involves the insertion of words, and as illustrated at block 106, it first important to find where in the sentence the insertion is needed. This is accomplished by ascertaining the numerical value corresponding to the insertion point as discussed above and as described in the following program. Thereafter as illustrated at 108, it is then important to find where the following character was drawn on the screen. This is followed by step 110 which results in drawing a caret symbol slightly below and to the left of the following character ascertained by block 108.

If the problem that is required to be fixed involves a changing of words, then as illustrated at block 112, it is important to find the extent of the problem as a range of character positions within the sentence. Thereafter the extent of the range of character positions is translated at 114 such that the extent of the range of positions is translated into a range of pixels where the characters appear on display 96. Then as illustrated at 116 that range of pixels identified in block 114 is underlined to mark the words required to be changed. As illustrated by lines 120 and 122, the program then looks to see if there are any more problems, the existence of which are required to be indicated on display 96.

It will be appreciated that the algorithm to implement the flow chart of FIG. 7B is now presented.

```
/*
 * GCdlogDirector.cp
 * for use with MERL Grammer Checker
 */ include "GCdlogDirector.h"
include "GCdlogDialog.h"
#include "CEditText.h"
#include "CPicture.h"
#include "CRadioGroupPane.h"
#include "CRadioControl.h"
#include "CButton.h"
#include "stdlib.h"
#include "string.h"
#include "CDecorator.h"
#include "sent.h"
#include "prob.h"
#include "gcheck.h"
include <ctype.h> extern int get_next_sentence(char *instring, char *outstring);
extern int SprintSentence(wordptr *, char *);     /* in word.c */
extern double MaxForward(wordptr SENT[], int LEN);
extern struct problem *GrammarProblems(wordptr SENT[], int LEN);
extern void cleanup(char *s, char *t);
extern void offerfixes(struct problem *);
extern void offerexplanation(struct problem *);

void freeMarkings(struct marking *markings);

extern CDesktop     *gDesktop;
extern CDecorator   *gDecorator;
extern double sprob;
extern wordptr words[];

struct problem *theproblems = NULL;
CEditText *statictext;
CEditText *explaintext;
CEditText *edittext;
CEditText *selectText;
CEditText *selectfixText;
CButton *revertButton;
CRadioGroupPane *fixgroup;
CRadioControl *fixradios[MAXFIX];
unsigned char fixStr[MAXFIX][100];
CRadioGroupPane *probgroup;
CRadioControl *probradios[MAXPROB];
unsigned char probStr[MAXPROB][100];
int selectedProblem;
int selectedFix;

/* for calling DisplayProblems from DoCommand */
struct problem *problems;
```

```c
    char *t;

struct marking {
    int type;       /* 0 => divot, 1 => line */
    CPicture *pict;
    struct problem *prob;
} markings[100];
int nextmark;

unsigned char *myCtoPstr(char *in, unsigned char *out)
{
    unsigned char *plen = out++;
    int len = 0;

while (*in != '\0') {
        *out++ = *in++;
        len++;
    }
    *plen = (unsigned char) len;

return plen;
} void GCdlogDirector::IDLOGDirector(short DLOGid, CDirectorOwner *aSupervisor)
{
    GCdlogDialog *dialog;

CDialogDirector::IDialogDirector(aSupervisor);
    dialog = new(GCdlogDialog);
    itsWindow = dialog;
    dialog->IDLOGDialog(DLOGid, gDesktop, this);
    gDecorator->CenterWindow(dialog);
} void performfix(int thefix)
{
    struct fix *fix;
    int i;
    int nextRadio = 0;
    int pstart;
    int pend;
    struct problem *prob = markings[selectedProblem].prob;
    Handle oldtext = statictext->GetTextHandle();
    char *otext;
    char newtext[1000];
    char *ntext = newtext;
    int left;

for (i=0, fix = prob->fixes; i!=thefix; i++, fix = fix->next) ;

pstart = words[0]->start + words[fix->i1]->start;
    pend = (fix->i2 == fix->i1) ? pstart-1 :
      words[0]->start + words[fix->i2 - 1]->end;
```

```
        HLock(oldtext);
           otext = (*oldtext);
           strncpy(ntext, otext, pstart);
           ntext += pstart;
           otext += pend;
           strcpy(ntext, fix->text);
           ntext += strlen(fix->text);
           left = statictext->GetLength()-pend;
           strncpy(ntext, otext, left);
           ntext[left] = '\0';
        HUnlock(oldtext);

edittext->SetTextPtr(newtext, strlen(newtext));
        revertButton->Show();
    } void revert()
    {
        Handle oldtext = statictext->GetTextHandle();
        char *otext;

HLock(oldtext);
           otext = (*oldtext);
           edittext->SetTextPtr(otext, statictext->GetLength());
        HUnlock(oldtext);
    } void GCdlogDirector::DoCommand(long theCommand)
    {
        switch (theCommand) {
            case cmdDone:
                EndDialog(theCommand, FALSE);
                if (itsWindow)                  // Close the window to prevent
                    itsWindow->Hide();          //   validation on resign (TCL 2.0)
                break;

case cmdIgnore:
            case cmdNext:
            case cmdCancel:
                EndDialog(theCommand, FALSE);
                break;

case cmdRevert:
                revert();
                fixgroup->SetStationID(0);
                revertButton->Hide();
                break;

case cmdFix1:
            case cmdFix2:
            case cmdFix3:
```

```
            case cmdFix4:
            case cmdFix5:
                selectedFix = theCommand - cmdFix1;
                performfix(selectedFix);
                break;

case cmdProb1:
            case cmdProb2:
            case cmdProb3:
            case cmdProb4:
            case cmdProb5:
            case cmdProb6:
            case cmdProb7:
            case cmdProb8:
                selectedProblem = theCommand - cmdProb1;
                DisplayProblems(t, problems);
                offerexplanation(markings[selectedProblem].prob);
                offerfixes(markings[selectedProblem].prob);
                break;

default:
                inherited::DoCommand(theCommand);
                break;
        }
}

Boolean GCdlogDirector::Validate(void)
{
    return TRUE;
} void GCdlogDirector::DisplayProblems(char *s, struct problem *problems)
{
    LongPt where1, where2;
    struct problem *probs;
    struct problem *selection;
    char plist[1000];
    int manyprobs;
    int nextpradio = 0;
    int i;
    int whichPICT;

if (problems == NULL) return;
    if (nextmark > 0) {
        for (i=0; i<nextmark; i++) {
            markings[i].pict->~CPicture();
        }
        nextmark = 0;
    }
    selection = (selectedProblem == -1) ? NULL : markings[selectedProblem].prob;

selectedFix = -1;
    manyprobs = (problems->next != NULL);
```

```
for (probs = problems; probs; probs = probs->next) {
    struct marking *mark = &markings[nextmark++];
    mark->prob = probs;

if (manyprobs) {
        probradios[nextpradio++]->SetTitle(myCtoPstr(probs->name, probStr[nextprad
    } if (probs->i2 == probs->i1) {
        mark->type = GCDIVOT;
        mark->pict = new CPicture;
        mark->pict->IPicture(statictext, this, 20, 20, 0, 0, sizFIXEDSTICKY, sizFI
        whichPICT = GCDivotPICT;
        if (mark->prob == selection || !manyprobs) whichPICT -= 4;
        mark->pict->UsePICT(whichPICT);

statictext->GetCharPoint(words[0]->start + words[probs->i1]->start, &where
        mark->pict->Place(where1.h - 6, where1.v - 5, TRUE);
    }
    else {
        Rect delta;

mark->type = GCLINE;
        mark->pict = new CPicture;
        mark->pict->IPicture(statictext, this, 0, 0, 0, 0, sizFIXEDSTICKY, sizFIXE
        whichPICT = GCLinePICT;
        if (mark->prob == selection || !manyprobs) whichPICT -= 4;
        mark->pict->UsePICT(whichPICT);
        mark->pict->SetScaled(TRUE);

statictext->GetCharPoint(words[0]->start + words[probs->i1]->start, &where
        statictext->GetCharPoint(words[0]->start + words[probs->i2-1]->end-1, &whe
        delta.top = 0;
        delta.left = 0;
        delta.bottom = 2;
        delta.right = where2.h - where1.h + 8;
        mark->pict->ChangeSize(&delta, FALSE);
        mark->pict->Place(where1.h, where1.v, TRUE);
    }
} selectText = (CEditText *) FindViewByID(GCSelectText);
selectfixText = (CEditText *) FindViewByID(GCSelectfixText);
revertButton = (CButton *) FindViewByID(GCRevertButton);
revertButton->Hide();
if (manyprobs) {
    selectText->Show();
    for (i=0; i<nextpradio; i++) {
        probradios[i]->Show();
        probradios[i]->Activate();
    }
    for (i=0; i<MAXFIX; i++) {
```

```
            fixradios[i]->Hide();
        }
        explaintext->Hide();
        selectfixText->Hide();
    }
    else {
        selectedProblem = 0;
        selectfixText->Show();
        selectText->Hide();
        offerexplanation(problems);
        offerfixes(problems);
    } for (i=nextpradio; i<MAXPROB; i++) {
        probradios[i]->Hide();
    }
} char *GCdlogDirector::DealWithUser(Handle text, long length, long offset, long selecte
{
    long delta = 0;
    long dismissCmd;
    long len;
    long tlen;
    int i;
    char *theCopy = (char *) malloc(2*length + 1000);
    char *theOriginal;
    int willbreak = FALSE;
    char *result = NULL;
    char *s;

t = theCopy;

statictext = (CEditText *) FindViewByID(GCStaticText);
    statictext->SetFontNumber(3);
    statictext->SetFontSize(14);

explaintext = (CEditText *) FindViewByID(GCExplainText);
    explaintext->SetFontNumber(3);
    explaintext->SetFontSize(14);
    explaintext->Hide();

edittext = (CEditText *) FindViewByID(GCEditText);
    edittext->SetFontNumber(3);
    edittext->SetFontSize(14);

probgroup = (CRadioGroupPane *) FindViewByID(GCProbGroup);
    probgroup->SetWantsClicks(TRUE);
    for (i=0; i<MAXPROB; i++) {
        probradios[i] = (CRadioControl *) FindViewByID(GCProbRadio1+i);
        probradios[i]->SetClickCmd(cmdProb1+i);
        probradios[i]->Hide();
    }
```

```
        fixgroup = (CRadioGroupPane *) FindViewByID(GCFixGroup);
        fixgroup->SetWantsClicks(TRUE);
        for (i=0; i<MAXFIX; i++) {
            fixradios[i] = (CRadioControl *) FindViewByID(GCFixRadio1+i);
            fixradios[i]->SetClickCmd(cmdFix1+i);
            fixradios[i]->Hide();
            fixradios[i]->SetGroupID(2);
        } s = (char *) malloc(length + 1);
        HLock(text);
          strncpy(s, *text, length);
        HUnlock(text);
        s[length] = '\0';
        theOriginal = s;

if (offset > 0) {
            strncpy(t, s, offset);
            t[offset] = '\0';
            t += offset;
            s += offset;
        } while (!willbreak) {
            char tokens[2000];
            int redoSentence;

if (s >= theOriginal + offset + selected) {
                break;
            } while (isspace(*s)) *t++ = *s++;

len = get_next_sentence(s, tokens);
            if (len <= 0) {
                len = strlen(s);
                willbreak = TRUE;
            }
            else {
                willbreak = FALSE;
            } ifdef DONTDOTHIS
        s = "This maybe sentence .\0";
        len = strlen(s);
        strcpy(tokens, s);
endif strncpy(t, s, len);
        t[len] = '\0';
        tlen = len;
```

```
            do {
                /*
                   len:  length of original sentence
                   tlen: current length of sentence
                   t:    current version of sentence to be checked
                */ redoSentence = FALSE;

SprintSentence(words, tokens);
                SplitSentence(tokens);
                sprob = MaxForward(SENTENCE, SLEN);
                problems = GrammarProblems(SENTENCE, SLEN);
                if (problems != NULL) {
                    theproblems = problems;

statictext->SetTextPtr(t, tlen);
                    edittext->SetTextPtr(t, tlen);
                    selectedProblem = -1;
                    probgroup->SetStationID(0);
                    DisplayProblems(t, problems);

dismissCmd = DoChangeableModalDialog(cmdNull, TRUE);
                    free_problem_list(&problems);
                    theproblems = NULL;
                    if (dismissCmd == cmdDone) {
                        willbreak = TRUE;
                    }
                    else if (dismissCmd == cmdNext) {
                        Handle newtext = edittext->GetTextHandle();
                        char *ntext;

HLock(newtext);
                          ntext = (*newtext);
                          tlen = edittext->GetLength();
                          strncpy(t, ntext, tlen);
                          t[tlen] = '\0';
                        HUnlock(newtext);

redoSentence = TRUE;
                        get_next_sentence(t, tokens);
                        result = theCopy;
                    }
                    else if (dismissCmd == cmdCancel) {
                        willbreak = TRUE;
                        result = NULL;
                    }
                }
            } while (redoSentence);

s += len;
            t += tlen;
        }
```

```
        strcat(t, s);
        free(theOriginal);
        nextmark = 0;
        if (result == NULL) free(theCopy);
        return result;
}
```

```
/*
 * GCdlogDirector.h
 * for use with MERL Grammer Checker
 */ define MENUgcheck        2000
define MENUparts         2004
#define MENUnounp         1999
define MENUlookup        1998 define GCDialog          130 define MAXPROB           6
define MAXFIX            4 define cmdFix1           101L
define cmdFix2           102L
#define cmdFix3           103L
#define cmdFix4           104L
#define cmdFix5           105L
#define cmdProb1          201L
#define cmdProb2          202L
#define cmdProb3          203L
#define cmdProb4          204L
#define cmdProb5          205L
#define cmdProb6          206L
#define cmdProb7          207L
define cmdProb8          208L define cmdIgnore         1L
define cmdDone           2L
#define cmdNext           3L
#define cmdCancel         4L
define cmdRevert         5L define GCEditText        3L
define GCStaticText      4L
#define GCExplainText     5L
#define GCProbGroup       6L
#define GCFixGroup        7L
#define GCSelectText      8L
#define GCProbRadio1      9L
#define GCFixRadio1       15L
#define GCSelectfixText   21L
define GCRevertButton    22L define GCDivotPICT       (short) 134
define GCLinePICT        (short) 135
#define GCDIVOT           0L
define GCLINE            1L include "CDLOGDirector.h"
include "CEditText.h"
```

```
struct GCdlogDirector : CDLOGDirector {
public:

virtual void    IDLOGDirector(short DLOGid, CDirectorOwner *aSupervisor);
    virtual void    DoCommand(long aCmd);
    virtual Boolean Validate(void);

virtual void    DisplayProblems(char *s, struct problem *problems);
    virtual char *  DealWithUser(Handle text, long length, long offset, long selected)
};
```

```c
/*
 * GCdlogDialog.cp
 * for use with MERL Grammer Checker
 */ include "GCdlogDirector.h"
include "GCdlogDialog.h"
#include "CPicture.h"
#include "Events.h"
#include "CEditText.h"
#include "CRadioGroupPane.h"
#include "CRadioControl.h"
#include "stdio.h"
#include "string.h"
#include "gcheck.h"
#include "CPaneBorder.h"
#include "CBartender.h"

extern CPicture *line;
extern CEditText *explaintext;
extern CEditText *selectfixText;
extern CRadioControl *fixradios[];
extern CRadioGroupPane *fixgroup;
extern struct problem *theproblems;
extern unsigned char fixStr[MAXFIX][100];
extern unsigned char probStr[MAXPROB][100];

extern CBartender *gBartender;
extern unsigned char *myCtoPstr(char *, unsigned char *);

char explainStr[300];

void cleanup(char *s, char *t)
{
    while (*s != NULL) {
        if (*s >= ' ' && *s <= '~') {
            *t++ = *s;
        }
        s++;
    }
    *t = '\0';
} void offerexplanation(struct problem *theproblem) {
    if (theproblem != NULL) {
        explainStr[0] = '\0';
        strcat(explainStr, "Explanation: ");
        cleanup(theproblem->expl, explainStr+13);
        explaintext->SetTextPtr(explainStr, strlen(explainStr));
        explaintext->Show();
    }
}
```

```
void offerfixes(struct problem *theproblem)
{
    char str[2000];
    struct fix *fixes;
    int i;
    int nextRadio = 0;

if (theproblem != NULL) {
        selectfixText->Show();
        fixgroup->SetStationID(0);
        for (fixes = theproblem->fixes; fixes != NULL; fixes = fixes->next) {
            if (fixes->text != NULL) {
                fixradios[nextRadio++]->SetTitle(myCtoPstr(fixes->text, fixStr[nextRad
            }
        } for (i=0; i<nextRadio; i++) {
            fixradios[i]->Show();
        }
        for (i=nextRadio; i<MAXFIX; i++) {
            fixradios[i]->Hide();
        }
    }
} void GCdlogDialog::DispatchClick(EventRecord *macEvent)
{
#ifdef DEBUG
    printf("x = %ld, y = %ld\n", macEvent->where.h, macEvent->where.v);
endif inherited::DispatchClick(macEvent);
} void GCdlogDialog::DoClick(Point hitPt, short modifierKeys, long when)
{
    inherited::DoClick(hitPt, modifierKeys, when);
}

CPane *GCdlogDialog::AddOverloadedItem(StringPtr itemText, short aWidth, short aHeight
                    short hEncl, short vEncl, CView *enclosure, tDITLItem *ditlItem)
{
    Str255      numStr;
    short       index;

if (Length(itemText) != 0) {
        if (EqualString(itemText, "\pRadioGroupPane", FALSE, FALSE)) {
            CPaneBorder *border;
            CRadioGroupPane *group = TCL_NEW(CRadioGroupPane,());

group->IRadioGroupPane(enclosure, this, aWidth, aHeight,
                        hEncl, vEncl, sizFIXEDSTICKY, sizFIXEDSTICKY);
            border = TCL_NEW(CPaneBorder,());
```

```
            border->IPaneBorder(kBorderNone);
            border->SetPenSize(defaultBorderPen, defaultBorderPen);
            group->SetBorder(border);

return group;
        }
    } return inherited::AddOverloadedItem(itemText, aWidth, aHeight, hEncl, vEncl,
        enclosure, ditlItem);
}
```

```
/*
 * GCdlogDialog.h
 * for use with MERL Grammer Checker
 */ include "CDLOGDialog.h"
include "stdlib.h"

struct GCdlogDialog : CDLOGDialog {
public:

#ifdef NOTUSING
    virtual CPane   *AddDITLRadioBtn(short aWidth, short aHeight, short hEncl,
                        short vEncl, CView *enclosure, tDITLItem *ditlItem,
                        long anID);
#endif
    virtual CPane   *AddOverloadedItem(StringPtr itemText, short aWidth, short aHeight,
                        short hEncl, short vEncl, CView *enclosure, tDITLItem *ditlItem);
    virtual void    DispatchClick(EventRecord *macEvent);
    virtual void    DoClick(Point hitPt, short modifierKeys, long when);
};
```

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. An interface for use with a grammar checking system having means for inputting a sentence and means for determining the correctness of the grammar of said sentence and for indicating an incorrect word or words in said sentence or the existence of missing words comprising:

means for displaying said sentence; and means responsive to the determination of said incorrect or missing words for driving said display to underline incorrect words and to indicate missing words through the display of a caret at the point at which a missing word is determined to exist, said driving means also displaying suggested word adjacent said caret.

2. The interface of claim 1 wherein said sentence exists on a line and wherein said caret is positioned below said line.

3. The interface of claim 1 wherein said driving means includes means for ascertaining the position of incorrect words in said sentence.

4. The interface of claim 1 wherein said driving means includes means for ascertaining the position of a missing words in said sentence.

5. The interface of claim 3 wherein said driving means includes means for converting the position of said incorrect word in said sentence to a corresponding position on said display.

6. The interface of claim 4 wherein said driving means includes means for converting the position of said missing word into a corresponding position on said display.

7. The interface of claim 5 wherein said position on said display corresponds to a pixel.

8. The interface of claim 6 wherein said position on said display corresponds to a pixel.

* * * * *